United States Patent
Hurst, Jr. et al.

(10) Patent No.: US 11,831,862 B2
(45) Date of Patent: Nov. 28, 2023

(54) EMBEDDED TIMESTAMPS FOR DETERMINING OFFSET BETWEEN TEST STREAMS

(71) Applicant: SRI International, Menlo Park, CA (US)

(72) Inventors: Robert Norman Hurst, Jr., Hopewell, NJ (US); Arkady Kopansky, Feasterville-Trevose, PA (US); Jonathan Parlett, Philadelphia, PA (US)

(73) Assignee: SRI INTERNATIONAL, Menlo Park, CA (US)

( * ) Notice: Subject to any disclaimer, the term of this patent is extended or adjusted under 35 U.S.C. 154(b) by 0 days.

(21) Appl. No.: 18/067,159

(22) Filed: Dec. 16, 2022

(65) Prior Publication Data

US 2023/0231988 A1 Jul. 20, 2023

Related U.S. Application Data (60) Provisional application No. 63/349,850, filed on Jun. 7, 2022, provisional application No. 63/301,440, filed on Jan. 20, 2022.

(51) Int. Cl.
*H04N 17/00* (2006.01)
*H04N 7/00* (2011.01)

(52) U.S. Cl.
CPC ..................................... *H04N 7/00* (2013.01)

(58) Field of Classification Search
CPC ...... H04N 17/004; H04N 17/00; H04N 17/02; H04N 17/04; H04N 2017/006; H04N 9/475

USPC ....... 348/194, 180, 460, 462, 464–466, 500, 348/512, 515
See application file for complete search history.

(56) References Cited

U.S. PATENT DOCUMENTS 10,158,927 B1 * 12/2018 Lei ..................... H04N 21/233
2020/0322677 A1 * 10/2020 Kovacs ............. H04N 21/6582

OTHER PUBLICATIONS

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of Audiovisual Services—Coding of Moving Video, High Efficiency Video Coding, The International Telecommunication Union, Jun. 2019, 696 pp.

* cited by examiner

*Primary Examiner* — Sherrie Hsia
(74) *Attorney, Agent, or Firm* — Shumaker & Sieffert, P.A.

(57) ABSTRACT

A computing system includes an interface, a memory, and processing circuitry. The interface is configured to receive, from a production system, a first test stream and a second test stream. The memory is in communication with the interface and is configured to store at least a portion of the first test stream and at least a portion of the second test stream. The processing circuitry is in communication with the memory and is configured to: detect first embedded information in the first test stream representative of a first timestamp and second embedded information in the second test stream representative of a second timestamp; determine, based on the first timestamp and the second timestamp, an offset between the first test stream and the second test stream; output the offset.

18 Claims, 7 Drawing Sheets

EMBEDDED TIMESTAMPS FOR DETERMINING OFFSET BETWEEN TEST STREAMS

This application claims the benefit of U.S. Provisional Application No. 63/301,440 entitled "SYSTEM AND METHODS FOR DETERMINING TIME OFFSET BETWEEN TWO OR MORE TIME STAMPED REFERENCE DATA STREAMS," filed Jan. 20, 2022, and of U.S. Provisional Application No. 63/349,850 entitled "ROBUST SYSTEM AND METHOD FOR CONVEYING ACCURATE IMAGE FRAME TIME INFORMATION," filed Jun. 7, 2022, the contents of each being incorporated herein by reference in their entirety.

TECHNICAL FIELD

The disclosure relates to quality assessment for media content in production systems.

BACKGROUND

Production systems may produce media content for delivery to consumers via various delivery networks. Given the wide variety of both production systems (in terms of production equipment, including cameras, mixers, converters, etc.) and delivery networks (such as satellite, fiber, coaxial cable, copper telephone, radio, etc. or combinations thereof), it is often difficult to assess quality of media content when delivered to downstream from the delivery networks to local distribution centers, which service local end-users (or, in other words, local customers).

As a result, content distribution entities that operate production systems and possibly at least portions of the delivery network have deployed quality assessment system to assess the quality of media content at local distribution centers. The content distribution entities may produce one or more test streams at the production systems that are then delivered to via the delivery networks to the local distribution centers (and in some instances local end-user devices) that allow the content distribution entities to assess a quality of the media content.

For video test streams, the content distribution entities may assess quality in terms of, as examples, frame rate, delay, luminance levels, resolution, color space, etc. For audio test streams, the content distribution entities may assess quality in terms of, as examples, delay, dynamic range, signal to noise ratio, tone, etc. In this way, the content distribution entities may be able to assess the quality of media content delivered to local distribution centers (and/or local customer devices) and modify the production system to potentially ensure high quality distribution of the media content that meets various quality of service (QoS) to which local costumers have subscribed.

SUMMARY

In general, this disclosure is directed to techniques that may enable robust verification of offset between two or more test streams. Television production systems may produce both video and audio signals (or, in other words, data) having various frame rates. While some delivery mechanisms, such as various streaming protocols (defined in, e.g., Motion Picture Experts Group—MPEG—2 and/or 4 standards) may provide metadata that defines timestamps for each stream to facilitate synchronization of the presentation of various data streams, such metadata may be lost or corrupted during delivery of the streams. Rather than provide extraneous metadata that is prone to loss or corruptions, a quality assessment system may implement various aspects of the techniques described in this disclosure to obtain information embedded in various test streams to assess the offset between the two or more test streams.

The quality assessment system may implement various aspects of the techniques to analyze information embedded in a video test stream that represents a timestamp as a series of chips, where each chip in the series of chips is a greyscale (or possibly color scale) set of pixels that denote an n-bit value (e.g., an 8-bit value). The series of chips may define the timestamp as an integer number of seconds from a reference time (e.g., Jan. 1, 1970). Similarly, audio test streams may include embedded information as a modulated tone that represents a timestamp in terms of an integer number of seconds from the same reference time. The quality assessment system may extract the timestamps and determine the offset between the video test stream and the audio test stream based on the extracted timestamps.

The timestamps may be augmented in various ways to be robust to frame rate conversions and other transformations performed by the production system for delivery via worldwide delivery networks (such as satellite-based delivery networks, fiber-based delivery networks, coaxial delivery networks, plain old telephone service—POTs—networks, etc. or combinations thereof). For example, a video test stream may include a pattern (e.g., a waveform, a texture, etc.) that facilitates accurate assessment of timestamps when the production system performs frame rate conversion that results in interpolation of video frames to insert additional frames and/or remove frames. Various aspects of the techniques may enable the quality assessment system to accurately identify frames and corresponding timestamps between frames using the patterns to better assess the offset between various frames when frame rate conversion occurs with respect to the test streams.

In this way, various aspects of the techniques may improve operation of the quality assessment system themselves. Rather than rely on erroneous or lost timestamps transmitted as metadata, the quality assessment system may analyze the content of the test streams themselves to obtain embedded information representative of the timestamps, which are more robust to product, network and/or other delivery errors that would otherwise prevent accurate reconstruction of the timestamps. Further by using embedded patterns that are robust to frame rate conversion, the quality assessment system may better identify timestamps that potentially more accurately reflect various transformations performed during production of the test streams. As such, the quality assessment systems may better identify offsets between test streams that may impact reproduction of the media content, allowing producers to more quickly identify and correct production errors that impact delivery of media content.

In one example, various aspects of the techniques are directed to a computing system that includes: an interface configured to receive, from a production system, a first test stream and a second test stream; a memory in communication with the interface, wherein the memory is configured to store at least a portion of the first test stream and at least a portion of the second test stream; and processing circuitry in communication with the memory, wherein the processing circuitry is configured to: detect first embedded information in the first test stream representative of a first timestamp and second embedded information in the second test stream representative of a second timestamp; determine, based on the first timestamp and the second timestamp, an offset between the first test stream and the second test stream; and output the offset.

In another example, various aspects of the techniques are directed to a method that includes: receiving, by an interface, a first test stream and a second test stream from a production system; storing, to a memory in communication with the interface, at least a portion of the first test stream and at least a portion of the second test stream; detecting, by processing circuitry of the interface, first embedded information in the first test stream representative of a first timestamp; detecting, by the processing circuitry of the interface, second embedded information in the second test stream representative of a second timestamp; determining, by the processing circuitry and based on the first timestamp and the second timestamp, an offset between the first test stream and the second test stream; and outputting, by the processing circuitry, the offset.

In another example, various aspects of the techniques are directed to a non-transitory computer-readable storage medium encoded with instructions that, when executed, cause processing circuitry of an interface to: receive a first test stream and a second test stream; store, to the non-transitory computer-readable storage medium, at least a portion of the first test stream and at least a portion of the second test stream; detect first embedded information in the first test stream representative of a first timestamp and second embedded information in the second test stream representative of a second timestamp; determine, based on the first timestamp and the second timestamp, an offset between the first test stream and the second test stream; and output the offset.

The details of one or more examples of the disclosure are set forth in the accompanying drawings, and in the description below. Other features, objects, and advantages of the disclosure will be apparent from the description and drawings, and from the claims.

DETAILED DESCRIPTION

Figure 1A:
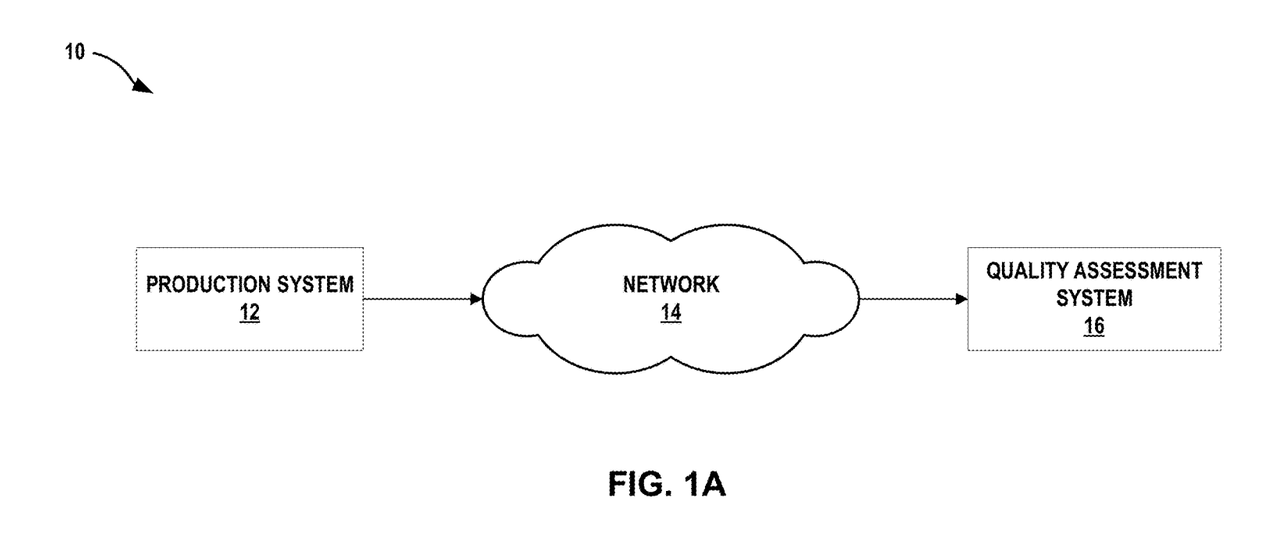
FIG. 1A is a conceptual diagram illustrating a computing system configured to perform various aspects of the embedded timestamp offset determination techniques described in this disclosure.

FIG. 1A is a conceptual diagram illustrating a computing system configured to perform various aspects of the embedded timestamp offset determination techniques described in this disclosure. As shown in the example of FIG. 1A, a computing system 10 includes a production system 12, a network 14, and a quality assessment system 16. It will be appreciated that computing system 10 represents only one example of the techniques of this disclosure and that other implementations of the described techniques are also enabled by this disclosure.

In the example of FIG. 1A, production system 12 represents a media production system that provides media content, e.g., video signals (which may also be referred to as video data) and/or audio signals (which may also be referred to as audio data). Such media content may represent television signals in the form of video data streams (or, in other words, video streams) and audio data streams (or, in other words, audio streams). Production system 12 may include cameras for capturing video streams, microphones for capturing audio streams, local broadcast trucks (e.g., local to the cameras) that perform pre-production (encoding/compression, source selection, mixing, etc.) and transmission (often via satellite networks), intermediate production systems that perform intermediate transformations (including frame rate transformations, video source selection/mixing, audio sampling transformations, audio source selection/mixing, etc.) and delivery via a delivery network to local distribution centers (which are often referred to as affiliate networks), and the local distribution centers that perform last mile delivery of the media content to end-users (which may also be referred to as customers or subscribers).

Network 14 represents any of or any combination of wired and/or wireless networks that provide connectivity between computing devices such as a wide-area network (e.g., a public network such as the Internet), a local-area network (LAN), an enterprise network, a wireless network, a cellular data network, a cable infrastructure-based data network (which may include satellite communication networks), a partial optical network, a telephony infrastructure-based data network (which may include satellite communication networks), a metropolitan area network (for example, Wi-Fi, WAN, or WiMAX), etc. or combinations of which that may form modern communication infrastructure for a cable television (TV) network, an over-the-air TV network, a satellite TV network, a combination of one or more of the foregoing networks, etc.

While shown as separate from production system 12, network 14 may also be owned and operated, at least in part, by production system 12. That is, production system 12 may often include network 14 for delivery of media content over wide areas to local affiliate networks, which are often owned and operated by different entities than the entities that own production system 12 and/or network 14. As such, while shown as separate from production system 12, network 14 may be owned and operated by production system 12 and/or separate from production system 12.

Quality assessment system 16 may represent a downstream (which refers to the flow of media content from production system 12 to network 14 and ultimately to quality assessment system 16, which may be located at an edge of network 14 prior to delivery to local distribution centers and/or customers/subscribers) test system capable of assessing a quality of media content received via network 14 from production system 12. Quality assessment system 16 may also be referred to as a television (TV) analyzer, a broadcast analyzer, or other type of analyzer capable of assessing various metrics related to video streams and/or audio streams. As such, quality assessment system 16 may also be referred to as analyzer 16.

Entities that own production system 12 may deploy quality assessment system 16 to measure a quality of media content delivered via network 14 (or possibly even produced by production system 12, e.g., at the broadcast trucks, intermediate productions systems, and/or other systems within the entirety of production system 12). Quality assessment system 16 may be configured to assess quality in a number of different ways. For video streams, quality assessment system 16 may measure perceived video quality (e.g., via indicators, such as blockiness, blur, etc.), delay, quality of service (e.g., packet delay, jitter, reordering, corruption, etc.), processing impact (e.g., processor usage, memory usage, etc.), etc. For audio streams, quality assessment system 16 may determine perceived audio quality (e.g., via indicators, such as bandwidth, high frequency presence, etc.), delay, tone, etc.

Quality assessment system 16 may perform some quality assessments with respect to various compression/decompression (or, so called, encoder/decoder, which is often referred to collectively as codecs) standards, such as High Efficiency Video Coding (HEVC) (which is also referred to as H.265), H.264, Motion Pictures Expert Group—MPEG—2 and/or 4, may also define codecs for delivery or transport of media content. With respect to these standards for video and audio compression/transport, quality assessment system 16 may analyze metadata sent with each of the video and audio streams in order to assess offsets (or, in other words, skew) between various streams.

That is, the standards define out-of-band metadata that production system 12 may utilize to reduce if not eliminate skew in presenting different transport streams (which is another way to refer to video and/or audio streams) synchronously in order to reduce the lip synch effect present when audio data is presented before and/or after video data. The human perceptual system is particularly sensitive to such offsets between presentation of video streams and audio streams. That is, the human perceptual system is highly sensitive to video presentation that does not align with audio presentation and offsets that exceed approximately 20 milliseconds (ms) may result in the human perceptual system detecting asynchronous presentation of video and audio data that appears to mimic lip synch issues.

Quality assessment system 16 may attempt to identify this skew via the metadata that defines timestamps for presentation of video and audio streams. Quality assessment system 16 may determine the skew as a difference between the timestamp defined in the metadata for the video stream and the timestamp defined in the metadata for the audio stream. Quality assessment system 16 may then output the skew for review by an administrator or other operator of production system 12 and/or delivery network 14 (which is shown as network 14).

However, in some instances, the metadata may be corrupted or otherwise lost due to a lack of data error detection and/or correction algorithms applied to metadata. That is, the various standards do not provide for robust data error detection and/or recovery of metadata and instead may focus bandwidth and/or other resources (e.g., computation resources, such as processor cycles, memory, etc.) in ensuring that the underlying video data and/or audio data is correctly communicated via network 14. The premise, in other words, of these standards is to ensure that the underlying payload (e.g., the audio and/or video data) is correctly communicated via network 14, while metadata, which merely facilitates accurate presentation, is not protected via such algorithms during delivery via network 14. In this respect, the metadata is unreliable and often lost and/or corrupted such that quality assessment system 16 is unable to accurately determine skew to the level of granularity necessary to ensure that such lip synch effects are not present during playback.

To avoid use of metadata, some test streams attempt to utilize an audio tone that is momentarily interrupted (about once per four seconds) in sync with a one frame change in the corresponding video signal. Analyzer 16 may detect both events in the audio and video and compare the time of occurrence of each, reporting the offset determined between the two events. This test procedure provides only one measurement every four seconds, making interactive delay adjustments slow and awkward, while also requiring specialized analyzers capable of detecting both events (meaning the brief interruption in the audio tone and the changed frame in the video signal). The low fidelity in detecting skew may reduce the ability to dynamically correct for the lip synch effect.

This lip synch effect may be further exacerbated as a result of processing performed by production system 12 to produce streams for different presentation systems. That is, there are a number of different distribution systems throughout the world that rely on different frame rates and other presentation systems (e.g., resolution systems involving ultra-high definition, high definition, standard definition; high dynamic range involving different electro-optical transfer functions—EOTFs; different audio format systems, including stereo systems, 2.1 systems, 5.1 systems, 7.2 systems, Dolby™ Atmos systems—or other systems that include a height component, etc.). To generate streams for each jurisdiction around the world, production system 12 may process video streams and/or audio streams to accommodate a local jurisdictions distribution system, resulting in various transformation that are applied to the underlying video streams and/or audio streams, which may introduce and/or remove frames for individual streams through interpolation or other transformations.

These transformations may introduce further processing delay that increases and/or decreases offsets that may not be accurately approximated by quality assessment system 16. The transformations may, in other words, transform the underlying video and/or audio streams in a manner that makes the captured video streams and/or audio streams unrecoverable (e.g., interpolation may proceed via algorithms that are undetectable by quality assessment system 16 via the metadata and that effectively prevent reconstruction of the captured video streams and/or audio streams). In this regard, the metadata may be unreliable in terms of defining how the received streams are generated, which may result in quality assessment system 16 being unable to accurately capture timestamps across various streams and therefore approximate skew between such streams based on inaccurate timestamps transmitted via such metadata.

In accordance with techniques of this disclosure, quality assessment system 16 may perform robust verification of offset between two or more test streams. Television production systems, such as production system 12, may produce both video and audio signals (or, in other words, data) having various frame rates. While some delivery mechanisms, such as various streaming protocols (defined in, e.g., Motion Picture Experts Group—MPEG—2 and/or 4 standards) may provide metadata that defines timestamps for each stream to facilitate synchronization of the presentation of various data streams, such metadata may be lost or corrupted during delivery of the streams. Rather than provide extraneous metadata that is prone to loss or corruptions, quality assessment system 16 may implement various aspects of the techniques described in this disclosure to obtain information embedded in various test streams to assess the offset between the two or more test streams.

Test streams may refer to streams injected into production system 12 that are delivered via network 14 to quality assessment system 16. The entity that operates production system 12 may test production system 12 along with network 14 in order to assess the quality of streams delivered via production system 12 and/or network 14 using test streams having test images and/or test audio to verify operation of production system 12 and/or network 14. In this sense, production system 12 and network 14 may deliver test streams in a closed system in that both injection of test streams and analysis of test streams is controlled by a single entity to provide assessment throughout production system 12 and network 14. Both production system 12 and quality assessment system 16 may be owned and operated by the same entity, which provides such a closed system that is not impacted by third parties or other outside entities.

Quality assessment system 16 may implement various aspects of the techniques to analyze information embedded in a video test stream that represents a timestamp as a series of chips, where each chip in the series of chips is a greyscale (or possibly color scale) set of pixels that denote an n-bit value (e.g., an 8-bit value). The series of chips may define the timestamp as an integer number of seconds from a reference time (e.g., Jan. 1, 1970). Similarly, audio test streams may include embedded information as a modulated tone that represents a timestamp in terms of an integer number of seconds from the same reference time. Quality assessment system 16 may extract the timestamps and determine the offset between the video test stream and the audio test stream based on the extracted timestamps. Quality assessment system 16 may then output this offset (e.g., via a display of quality assessment system 16 or via reports or other data presentation formats).

In operation, production system 12 may embed information 20 ("embedded information 20") into a test image 22 of the test stream. Quality assessment system 16 may receive (e.g., via an interface) test image 22, and determine a timestamp for test image 22 based on embedded information 20. By including the timestamp in the test stream as embedded information 20, the risk of embedded information 20 being lost or corrupted such that the timestamp cannot be determined may decrease significantly (given, for example, that various transports defined by standards may provide more robust error detection and/or correction for the test stream data compared to metadata). Thus, the techniques of this disclosure may improve system robustness.

Figure 1B:
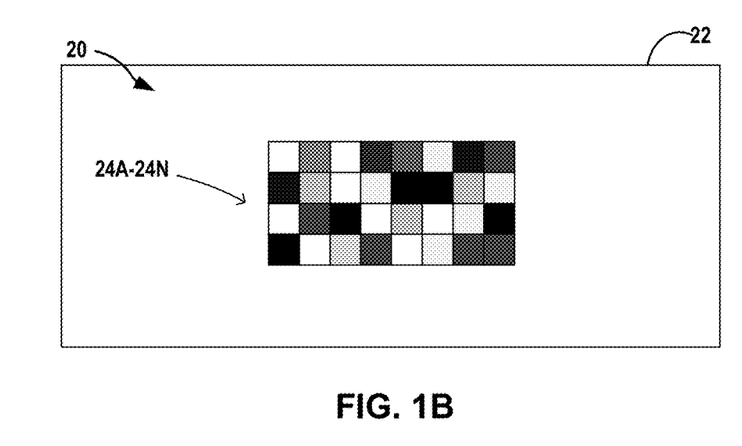
FIG. 1B is a conceptual diagram illustrating an example test image including embedded information in accordance with techniques of this disclosure.

As noted above, production system 12 may include embedded information 20 in a test stream. For example, as shown in FIG. 1B, production system 12 may configure pixels associated with test image 22 to form an array of chips 24A-24N (collectively, "chips 24"). Although illustrated in FIG. 1B as squares, chips 24 may have any shape. For example, chips 24 may be rectangles, circles, triangles, etc.

Production system 12 may embed any information in test image 22 useful for assessing quality of test stream 20. For example, embedded information 20 may include a timestamp, color space information, optical-to-electrical transfer function (OETF) information, gamma function information, frame rate information, bit depth information, color difference image subsampling information, resolution information, color volume information, sub-channel interleaving information, cropping information, Y'CbCr to R'G'B' matrix information, /Y'UV to R'G'B' matrix information, a black level value, a white level value, a diffuse white level, audio-video offset information, and/or other characteristics of media content.

Production system 12 may configure each of chips 24 to have a chip value indicating one or more digital bits of information. In some examples, values for chip 24 may be associated with pixel values, such as various shades of gray ranging from black to white or different colors (belonging to, e.g., a Red Blue Green (RBG) color space). For example, production system 12 may configure each of chips 24 to be rendered by quality assessment system 16 as one of eight shades of gray.

Quality assessment system 16 may receive test image 22 with embedded information 20 from production system 12. Quality assessment system 16 may be configured to detect embedded information 20 in test image 22 and determine a timestamp based on embedded information 20. For example, quality assessment system 16 may identify the chip value of each of chips 24 based on the pixel value (e.g., the shade of gray) of each chip. Quality assessment system 16 may then convert the chip value into one or more digital bits of information, which quality assessment system 16 may parse to determine a timestamp for test image 22.

In some examples, the timestamp may represent a duration between a transmission time of test image 22 and a reference time. For example, the timestamp may equal Unix time (i.e., the number of seconds that have elapsed since 00:00:00 UTC on 1 Jan. 1970, the beginning of the Unix epoch). In such examples, the duration represented by the timestamp may be an integer number of seconds.

Thus, system 10 may implement techniques of this disclosure to assess the quality (e.g., timing) of test stream 20, which may enable automatic quality adjustment operations. For example, quality assessment system 16 may use embedded information 20 to address an offset between a first test stream and a second test stream. In this way, the techniques of this disclosure may advantageously reduce the risk of losing information required for implementing corrective measures to address deviations in media content quality.

The timestamps may be augmented in various ways to be robust to frame rate conversions and other transformations performed by the production system for delivery via worldwide delivery networks (such as satellite-based delivery networks, fiber-based delivery networks, coaxial delivery networks, plain old telephone service—POTs—networks, etc. or combinations thereof). For example, a video test stream may include a pattern (e.g., a waveform, a texture, etc.) that facilitates accurate assessment of timestamps when production system 12 performs frame rate conversion that results in interpolation of video frames to insert additional frames and/or remove frames. Various aspects of the techniques may enable quality assessment system 16 to accurately identify frames and corresponding timestamps between frames using the patterns to better assess the offset between various frames when frame rate conversion occurs with respect to the test streams.

In this way, various aspects of the techniques may improve operation of quality assessment system 16 itself. Rather than rely on erroneous or lost timestamps transmitted as metadata, quality assessment system 16 may analyze the content of the test streams themselves to obtain embedded information 20 representative of the timestamps, which are more robust to production, network and/or other delivery errors that would otherwise prevent accurate reconstruction of the timestamps. Further by using embedded patterns that are robust to frame rate conversion, quality assessment system 16 may better identify timestamps that potentially more accurately reflect various transformations performed during production of the test streams. As such, quality assessment system 16 may better identify offsets between test streams that may impact reproduction of the media content, allowing producers to more quickly identify and correct production errors that impact delivery of media content.

Figure 2:
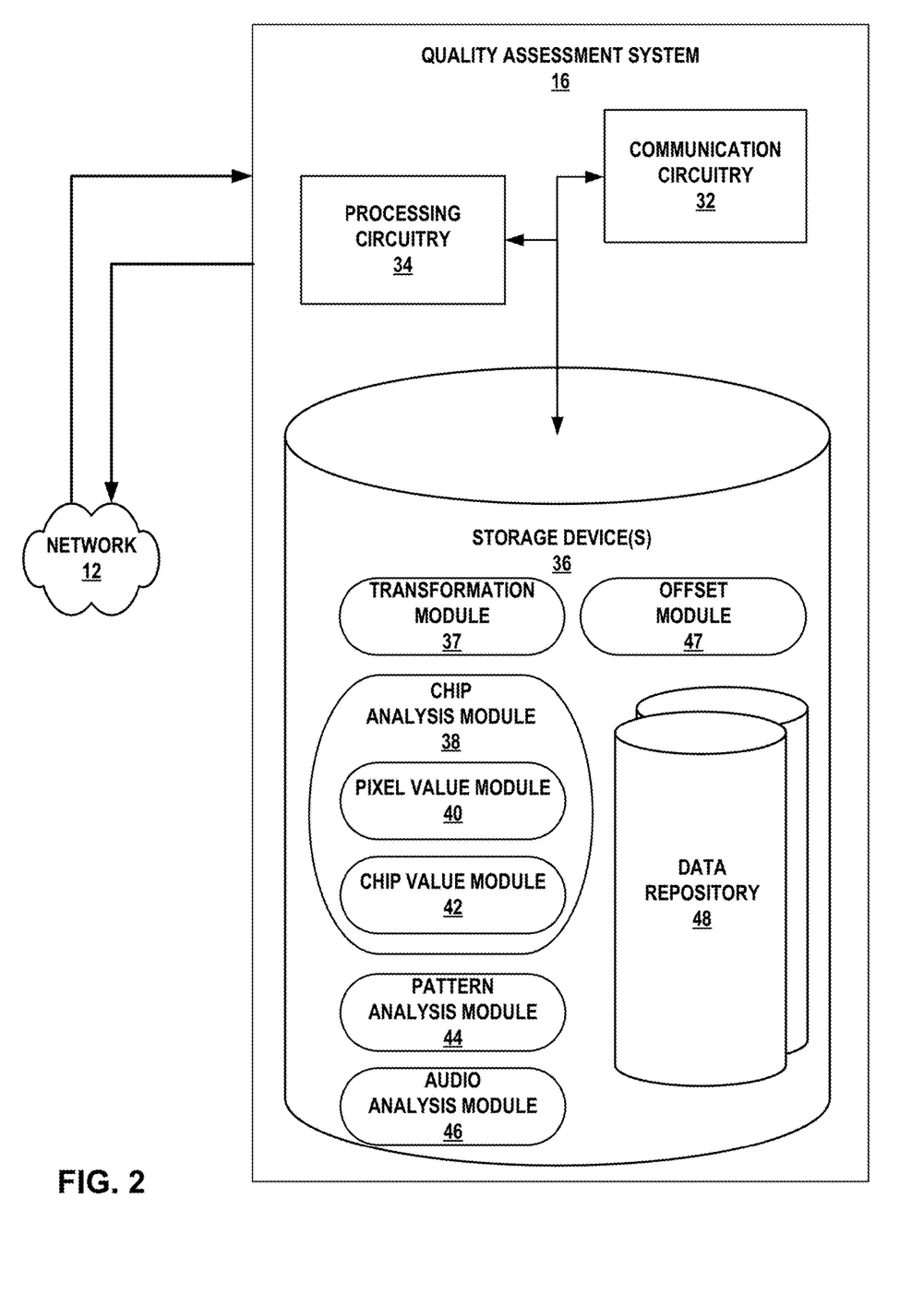
FIG. 2 is a block diagram illustrating an example implementation of the system shown in FIG. 1A.

FIG. 2 is a block diagram illustrating an example implementation of quality assessment system shown in FIG. 1A. As shown in the example of FIG. 2, quality assessment system 16 includes communication circuitry 32, processing circuitry 34, and one or more storage devices 36. As further shown in the example of FIG. 2, storage device(s) 36 includes a transformation module 37, a chip analysis module 38, a pixel value module 40, a chip value module 42, a pattern analysis module 44, an audio analysis module 46, and a data repository 48. However, in other examples, quality assessment system 16 may include fewer, additional, or different components and/or circuitry.

Communication circuitry 32 of quality assessment system 16 may represent an interface configured to communicate with devices external to quality assessment system 16 by transmitting and/or receiving data. Communication circuitry 32 may operate, in some respects, as an input device, or as an output device, or as a combination of input device(s) and output device(s). In some instances, communication circuitry 32 may enable quality assessment system 16 to communicate with other devices over network 14, as shown in the example of FIG. 2. In other examples, communication circuitry 32 may send and/or receive radio signals on a radio network such as a cellular radio network. Examples of communication circuitry 32 include a network interface card (e.g., an Ethernet card), an optical transceiver, a radio frequency transceiver, a GPS receiver, or any other type of device that can send and/or receive information. Other examples of communication units 32 may include Bluetooth®, GPS, 3G, 4G, and Wi-Fi® radios found in computing devices (such as mobile devices) as well as Universal Serial Bus (USB) controllers, and the like. In some examples, quality assessment system 16 may use communication circuitry 32 to offload computationally intensive tasks to other devices with which quality assessment system 16 communicates over network 14 (which is often referred to as "cloud computing").

Processing circuitry 34, in one example, is configured to implement functionality and/or process instructions for execution within quality assessment system 16. For example, processing circuitry 34 may be configured to process instructions stored in storage device(s) 36. Examples of processing circuitry 34 may include any one or more of a microcontroller unit (MCU), e.g. a computer on a single integrated circuit containing a processor core, memory, and programmable input/output peripherals, a microprocessor (μP), e.g. a central processing unit (CPU) on a single integrated circuit (IC), a controller, a digital signal processor (DSP), an application specific integrated circuit (ASIC), a field-programmable gate array (FPGA), a system on chip (SoC) or equivalent discrete or integrated logic circuitry. A processor may be integrated circuitry, i.e., integrated processing circuitry, and that integrated processing circuitry may be realized as fixed hardware processing circuitry, programmable processing circuitry and/or a combination of both fixed hardware processing circuitry and programmable processing circuitry.

Storage device(s) 36 may be configured to store information within quality assessment system 16 during operation, such as test image 22 as described above with respect to the example of FIG. 1B. In some examples, storage device(s) 36 may include temporary memory, meaning that a primary purpose of the temporary memory portion of storage device(s) 36 is not long-term storage. Storage device(s) 36, in some examples, may incorporate volatile memory, meaning that the volatile memory portion of storage device(s) 36 does not maintain stored contents when quality assessment system 16 is turned off or otherwise is not powered on. Examples of volatile memories may include random access memories (RAM), dynamic random access memories (DRAM), static random access memories (SRAM), and other forms of volatile memories known in the art. In some examples, storage device(s) 36 may be used to store program instructions for execution by processing circuitry 34. In some instances, software or applications running on quality assessment system 16 may use storage device(s) 36 to store information temporarily during program execution.

Storage device(s) 36, in some examples, may include one or more non-transitory computer-readable storage media (where "non-transitory" refers to the capability of the memory to statically store data rather than propagate data as a signal via a wire or bus). Storage device(s) 36 may be configured to store larger amounts of information than volatile memory. Storage device(s) 36 may further be configured for long-term storage of information. In some examples, storage device(s) 36 includes non-volatile storage elements. Examples of such non-volatile storage elements include magnetic hard discs, optical discs, solid state drives, floppy discs, flash memories, or forms of electrically programmable memories (EPROM) or electrically erasable and programmable (EEPROM) memories.

Storage device(s) 36 may store modules 37-47 and data repository 48. Quality assessment system 16 (or one or more components thereof) may use modules 37-47 and/or data repository 48 to determine a time stamp from a test stream. For example, chip analysis module 38 may extract timestamp information from chips 24 using pixel value module 40 and chip value module 42.

Pixel value module 40 may determine the pixel value of each chip of chips 24. In some examples, pixel value module 40 may average the pixel values of all the pixels in a chip to determine a representative pixel value for the chip. In this way, pixel value module 40 may account for possible variation in pixel values in a chip.

Chip value module 42 may determine the chip value for each chip based on the pixel value for each chip. For example, chip value module 42 may apply a table or function stored in data repository 48 to the pixel value for each chip to determine an associated chip value. In general, data repository 48 may be any data structure or software that stores and/or manages data. Examples of data repository 48 may include relational databases, multi-dimensional databases, maps, hash tables, etc.

Chip analysis module 38 may convert the chip value for each chip into one or more digital bits of information. For example, chip analysis module 38 may apply a table or function stored in data repository 48 to the chip value for each chip to determine an associated one or more digital bits of information. Chip analysis module 38 may parse the one or more digital bits of information (e.g., into tag, length, and value for an informational element. For example, chip analysis module 38 may determine a timestamp for test image 22 based on the one or more digital bits of information.

The various functionality of modules 37-47, when executed by processing circuitry 34, are described in more detail with respect to the examples of FIGS. 3-7.

Figure 3:
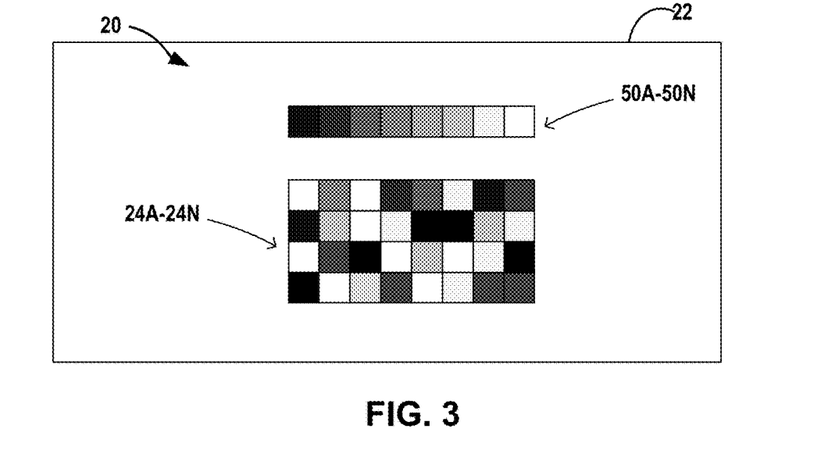
FIG. 3 is a conceptual diagram illustrating aspects of a test image in accordance with techniques of this disclosure.

FIG. 3 is a conceptual diagram illustrating example aspects of test image 22 in accordance with techniques of this disclosure. As shown in FIG. 3, test image 22 includes embedded information 20, such as chips 24.

In some examples, transformation module 37 of quality assessment system 16 may apply a function to test image 22, such as a gamma function, an electro-optical transfer function (e.g., a transfer function that converts a picture or video input into a linear light output for display), etc. In so doing, transformation module 37 may modify the original pixel values of test image 22, thereby modifying the chip values of chips 24. To ensure that quality assessment system 16 converts the modified chip values into the correct digital bits of information, production system 12 may include an array of reference chips 50A-50N (collectively, "reference chips 50") in embedded information 20. Thus, if transformation module 37 modifies the original pixel values of test image 22 by processing test image 22, transformation module 37 may modify chips 24 and reference chips 50 in a similar fashion.

Chip analysis module 38 of quality assessment system 16 may determine the relationships between chip values and pixel values (which may or may not be modified due to processing) using reference chips 50. For example, production system 12 may configure each of reference chips 50 to have a predesignated chip value based on a position of the reference chip with respect to reference chips 50. Chip value module 42 may determine the predesignated chip value of each reference chip based on the position of the reference chip. Pixel value module 40 may determine the pixel value of each reference chip. Chip analysis module 38 may then correlate the predesignated chip value of each reference chip to the pixel value of each reference chip.

Chip value module 42 may determine the chip value of each of chips 24 based on the pixel value (which may or may not be modified due to processing) of each chip. For example, pixel value module 40 may determine the pixel value of each chip. Pixel value module 40 may detect a match or a near-match (e.g., similarity within a predefined threshold delta) between a chip and a reference chip of reference chips 50 based on pixel values. Chip value module 42 may then determine the chip value of the chip (and the associated digital bits of information) to be the same as the chip value for the matching reference chip.

Figure 4:
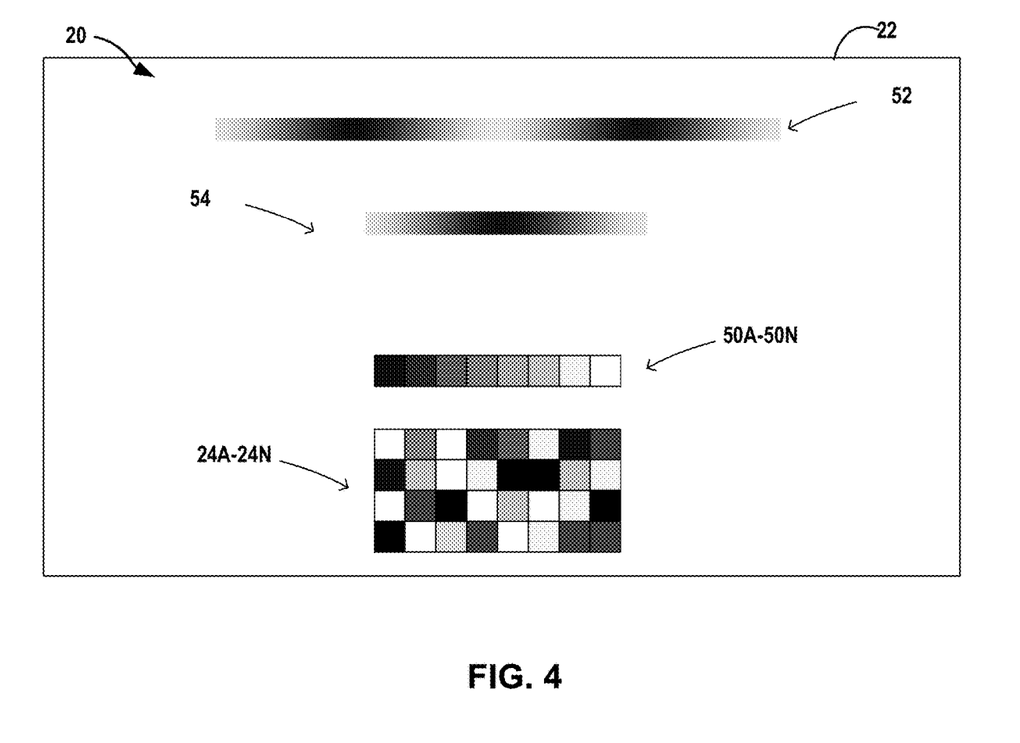
FIG. 4 is a conceptual diagram illustrating aspects of a test image in accordance with techniques of this disclosure.

FIG. 4 is a conceptual diagram illustrating example aspects of test image 22 in accordance with techniques of this disclosure. As shown in FIG. 3, test image 22 includes embedded information 20, such as chips 24 and reference chips 50.

In some examples, production system 12 may convert a test stream from a first frame rate (e.g., 24 FPS) to a second frame rate (e.g., 30 FPS. In some examples, production system 12 may convert the frame rate by performing motion interpolation or "tweening." Motion interpolation may refer to the merging of consecutive images of a video stream to synthesize the position of smoothly-moving objects at their correct position in time. While generally beneficial, motion interpolation may merge (e.g., average the pixel values of) the arrays of chips of consecutive images, potentially rendering the encoded digital bits of information unrecoverable.

Motion interpolation may result in little or no modification when consecutive images of a test stream are not changing between the images. Thus, if production system 12 configures chips 24 to change, for example, every second (which is relatively slow compared to a standard frame rate of a video stream), chips 24 may not be significantly affected (if at all) by motion interpolation of test image 22. However, motion interpolation may result in considerable modification when consecutive images of a test stream are changing between the images. Thus, if production system 12 configures chips 24 to change many times per second, chips 24 may be significantly affected by motion interpolation of test image 22, which may hinder extracting timestamp information from chips 24.

In accordance with techniques of this disclosure, production system 12 may include a fixed pattern 52 in embedded information 20 of test image 22. Fixed pattern 52 may be fixed in that quality assessment system 16 (e.g., pattern analysis module 44) may unambiguously determine a position of fixed pattern 52 as fixed pattern 52 appears to slide from frame to frame. Production system 12 may configure fixed pattern 52 to have a range of pixel values. Production system 12 may further configure fixed pattern 52 to appear to move, shift, or otherwise slide with every image of a test stream (e.g., each frame of the test stream). As such, a phase of fixed pattern may correspond at least in part to a frame associated with test image 22.

In some examples, the fixed pattern 52 may appear to slide at a constant rate with every image. For example, fixed pattern 52 may appear to slide to the right of test image 22 a specific number of pixels per image before restarting (e.g., every second). Alternatively, fixed pattern 52 may appear to slide to the left of test image 22 before restarting. It will be appreciated that fixed pattern 52 may appear to slide in directions other than right and left as well.

Pattern analysis module 44 may determine a phase of fixed pattern 52 based on a position of a specific portion of fixed pattern 52 (e.g., relative to an initial position, such as the position corresponding to a 0 sub-second component of the timestamp). In some examples, production system 12 may configure each portion of fixed pattern 52 to have a predesignated series of pixel values. In such examples, pattern analysis module 44 may be configured to detect the specific portion of fixed pattern 52 based on the series of pixel values of the specific portion of fixed pattern 52. Although not illustrated in FIG. 2, pattern analysis module 44 may include a pixel value module similar to pixel value module 42 and configured to detect pixel values of fixed pattern 52. Alternatively, pattern analysis module 44 may be configured to use pixel value module 42 to detect pixel values of fixed pattern 52.

Quality assessment system 16 may determine a timestamp of test image 22 based on chips 24 and the phase of fixed pattern 52. For example, chip analysis module 38 may use the chip values of chips 24 to determine the second component of the timestamp, and pattern analysis module 44 may use the phase of fixed pattern 52 to determine the sub-second (i.e., a time interval less than a second) component of the timestamp. For example, pattern analysis module 44 may use the frame rate of a test stream, the number of pixels fixed pattern 52 appears to slide (e.g., from a reference phase of fixed pattern 52 corresponding to a 0 sub-second component of the timestamp), and the number of pixels per image that fixed pattern 52 is configured to appear to slide to determine a frame number of test image 22.

For example, if the frame rate of a test stream is 24 FPS, the number of pixels fixed pattern 52 appears to slide is 150 pixels, and the number of pixels fixed pattern 52 appears to slide per image is 30 pixels, then pattern analysis module 44 may determine that the frame number of test image 22 is 5. Thus, pattern analysis module 44 may determine the sub-second component of the timestamp to be equal to 5/24 seconds or about 208 milliseconds (ms).

In some examples, transformation module 37 of quality assessment system 16 may apply a function to test image 22, such as a gamma function, an electro-optical transfer function (e.g., a transfer function that converts a picture or video input into a linear light output for display), etc. In so doing, quality assessment system 16 may modify the original pixel values of test image 22, thereby modifying the pixel values of fixed pattern 52. To ensure that quality assessment system 16 can determine the phase of fixed pattern 52, production system 12 may include a reference pattern 54 in embedded information 20. Thus, if transformation module 37 modifies the original pixel values of test image 22 by processing test image 22, transformation module 37 may modify fixed pattern 52 and reference pattern 54 in a similar fashion. In the example of FIG. 4, reference pattern 54 is half the length of fixed pattern 52.

Pattern analysis module 44 of quality assessment system 16 may determine the phase of fixed pattern 52 by comparing portions of fixed pattern 52 to reference pattern 54. For example, pattern analysis module 44 may detect a match or near-match between a specific portion of fixed pattern 52 and reference pattern 54. In some examples, pattern analysis module 44 may compare fixed pattern 52 to reference pattern 54 using motion estimation. In any case, responsive to detecting the specific portion of fixed pattern 52 in test image 22, pattern analysis module 44 may determine the position of the specific portion of fixed pattern 52 and in turn the phase of fixed pattern 52.

Figure 5:
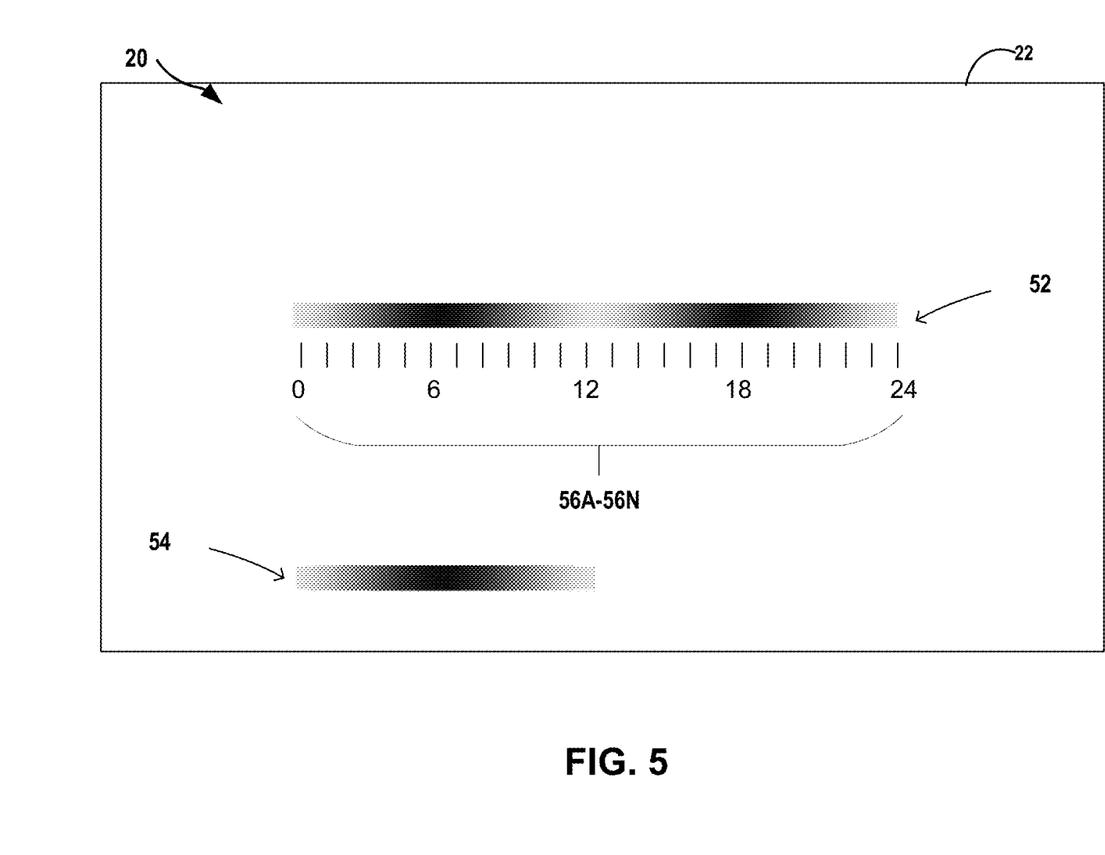
FIG. 5 is a conceptual diagram illustrating example aspects of a test image in accordance with techniques of this disclosure.

FIG. 5 is a conceptual diagram illustrating example aspects of test image 22 in accordance with techniques of this disclosure. As shown in FIG. 5, test image 22 includes embedded information 20, such as fixed pattern 52 and reference pattern 54.

In some examples, pattern analysis module 44 may be configured to compare fixed pattern 52 to reference pattern 54 at a set of phase positions 56A-56N (collectively, "phase positions 56") for fixed pattern 52. Phase positions 56 may derive from a frame rate of the test stream. For example, if the frame rate of the test stream is 24 FPS, quality assessment system 16 may compare fixed pattern 52 to reference pattern 54 at 24 specific positions to detect a match or near-match between a specific portion of fixed pattern 52 and reference pattern 54. Comparing fixed pattern 52 to reference pattern 54 at phase positions 56 may advantageously result in a mathematically exact match between the specific portion of fixed pattern 52 and reference pattern 54, improving accuracy (and therefore reducing error) when determining a timestamp for test image 22. Additionally, comparing fixed pattern 52 to reference pattern 54 at phase positions 56 may be more computationally efficient (e.g., because pattern analysis module 44 is comparing fixed pattern 52 to reference pattern 54 at fewer positions than otherwise). In some examples, pattern analysis module 44 may determine the frame rate of the test stream based on the phase of fixed pattern 52.

In some examples, quality assessment system 16 may determine whether the frame rate of a test stream is being converted from a first integer frame rate to a second integer frame rate or to a first fractional frame rate to a second fractional frame rate. For example, production system 12 may include the first frame rate and the second frame rate of the test stream in embedded information 20 of test image 22, and quality assessment system 16 may extract the first frame rate and the second frame rate from embedded information 20. Responsive to determining that the frame rate of the test stream is being converted from a first integer to a second integer or to a first fraction to a second fraction, pattern analysis module 44 may compare fixed pattern 52 to reference pattern 54 at phase positions 56, as described above. However, responsive to determining that the frame rate of the test stream is not being converted from a first integer to a second integer or to a first fraction to a second fraction, pattern analysis module 44 may compare each portion of fixed pattern 52 having the same length as reference pattern 54 to reference pattern 54.

In some examples, pattern analysis module 44 may determine whether the frame rate of the test stream is an integer frame rate or a fractional frame rate. Motion interpolation due to frame rate conversion may corrupt fixed pattern 52, resulting in a corresponding change to the value of a descriptor represented by fixed pattern 52. There is a difference in the value of the descriptor for a fractional and integer frame rate. When an integer frame rate stream's descriptor is updated, the descriptor value may increase by X (e.g., 960,000) number of tics (e.g., a sub-second unit of time). When a fractional frame rate stream's descriptor is updated, the descriptor value may increase by 1001/1000*X (e.g., 960,960) number of tics. Thus, pattern analysis module 44 may check the difference between current and previous descriptors in response to the descriptors updating. If, for example, the difference is 960960 tics, then pattern analysis module 44 may determine that the original stream was a fractional framerate; if the difference is 960000 tics, then pattern analysis module 44 may determine that the original stream was an integer framerate.

Figure 6:
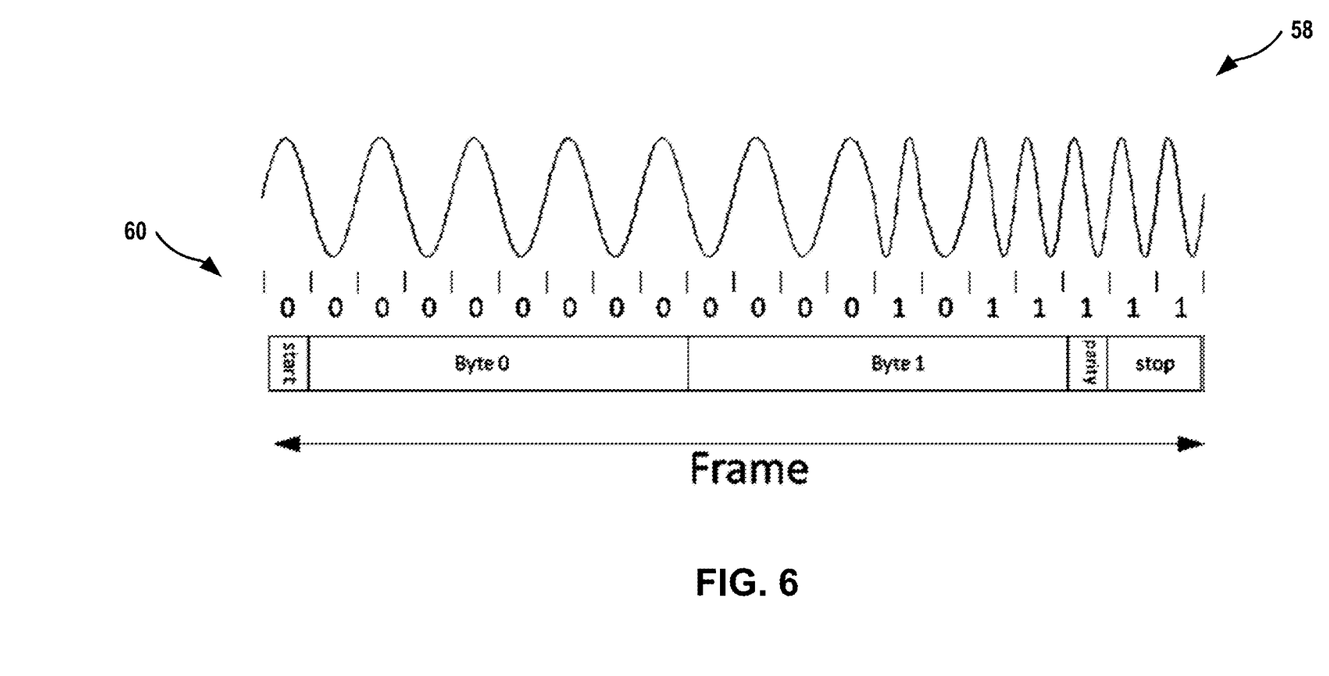
FIG. 6 is a conceptual diagram illustrating example aspects of test audio in accordance with techniques of this disclosure.

FIG. 6 is a conceptual diagram illustrating example aspects of test audio 58 (including audio data) of a test stream (e.g., an audio test stream) in accordance with techniques of this disclosure. Production system 12 may be configured to embed information 60 ("embedded information 60") in test audio 58 of the test stream. Quality assessment system 16 may receive test audio 58 (which storage device(s) 36 may be configured to store), and audio analysis module 46 of quality assessment system 16 may determine a timestamp for test audio 58 based on embedded information 60. By including the timestamp in the test stream as embedded information 60, the risk of embedded information 60 being lost or corrupted such that the timestamp cannot be determined may decrease significantly. Thus, the techniques of this disclosure may improve system robustness.

In some examples, embedded information 60 may include a bit sequence data structure (or "frame") including a starting bit, one or more payload bits, a parity bit, and two or more stop bits. The bit sequence data structure may be an example of a Differential Manchester line code. For example, the bit sequence data structure may be defined as: 1 bit with the value 0; 16 bits (2 bytes) of data; 1 parity bit such that the start bit, the 16 data bits, and the parity bit include an even number of 0s; and 2 or more bits with the value 1. This example bit sequence data structure includes a total of 20 bits carrying 16 bits of payload. The payload may be increased at the risk of a higher probability of more than one bit error in the bit sequence data structure, which may be undetectable by the parity bit.

The parity bit may guarantee polarity. For example, the parity bit may not only provide the usual detection of single-bit errors in the data, but also ensure that there is an even number of 0s. Since 0s are transmitted as a half cycle of a differential Manchester pattern, each 0 inverts the direction of the next transition, so that, for example, the start bit 0 may either be a negative or a positive half-cycle. The inclusion of the parity bit may ensure that there is an even number of 0s such that the start bit has the same polarity and thus may be used to detect polarity inversion of the signal. Because the Differential Manchester line code is insensitive to polarity and data can be recovered from either normal or inverted audio data, the consistent polarity of the start bit may allow audio analysis module 46 to determine whether test audio 58 is inverted or not.

Audio analysis module 46 may detect embedded information 60 in test audio 58. Audio analysis module 46 may be configured to use the 16 data bits to determine a timestamp for test audio 58. In some examples, production system 12 may test multimedia content including a video test stream and an audio test stream where the audio test stream corresponds to the video test stream. In such examples, offset module 47 of quality assessment system 16 may output, based on the timestamp for test image 22 and the timestamps for test image 58, an offset between the timestamps. In some examples, offset module 47 of quality assessment system 16 may correct the offset (e.g., by adding or removing delay from one or both test streams).

Techniques for aligning fractional video frame rates are discussed in the following. Currently, there are several fractional video frame rates currently in use that are 1000/1001 lower than the closest integer rate (e.g., 60.00 and 60.00*1000/1001, sometimes abbreviated as "59.94"). In the example of FIG. 6, a frame includes 20 bits, and 20 is a sub-multiple of 1000. There are thus 50 frames per 1000 bits. In an example that requires the audio bit frame structure to periodically align with the video frame structure, this may be achieved for fraction video frame rates by adding one extra stop bit after every 50th frame, resulting in 1001 bits sent rather than 1000. This slows down the byte rate by 1000/1001, avoiding the slow precession of bytes against the fraction video frame rate that would occur had the 1001st bit not been added. It will be appreciated that adding any number of extra stop bits does not change the polarity of the start bit because stop bits are each one full cycle of the carrier. Adding 1 bit per 50 frames works regardless of the underlying raw bit rate.

Techniques for data descriptors are discussed in the following. The sequence of bytes carried in an audio frame structure or chips 24 may be used to carry data about the audio or video respectively. In some examples, data may be organized into key/length/value descriptors: exampleDescriptor

```
{
    key;      // 8 bits. Identifies the type of descriptor
    length;   // 8 bits. Number of bytes in value
    value;    // N * 8 bits. The data for the descriptor
}
```

In some examples, the value may include a cyclical redundancy code (CRC) to verify the integrity of the value, such as an 8-bit CRC code, so that quality assessment system 16 may verify the integrity of the data received.

Descriptors may include data such as the version number of the test stream, the type of test stream, the manufacturer of the equipment from which the test stream is emanating, or the source of the content, such as a network company or a city of origin.

Time may be of particular interest because several elements of a program (video and one or more audio streams, typically) may be shifted in time relative to one another. A descriptor may be defined that indicates the relative or absolute time or date. In some examples, this descriptor may carry both the date and the audio channel number (the channel number may have no meaning when carried in the video stream). In some examples, the value of "time" in the descriptor corresponds to the time the descriptor was sent. For the video, this may mean the time test image 22 containing the descriptor was sent. For the audio, this may mean the time the leading edge of the start bit of the data frame of test audio 58 containing the key of the descriptor. Other arrangements are contemplated by this disclosure.

An example definition of the time_and_channel is the following:
time_and_channel( )#10 bytes

```
{
    key         8 = 0x07
    length      8 = 8
    seconds     32
    tics480     19 # of 480,000 Hz
    channel     5
    CRC8        8
}
```

The key may be arbitrarily given the value 7. The length may be 8 bytes. The seconds field may represent the number of seconds since the Unix epoch (Jan. 1, 1970) represented as an unsigned integer. The tics480 field may be a 19-bit unsigned integer indicating cycles of a 480,000 Hz clock, taking values from 0 to 479,999. The value of tics480=0 may correspond to the moment when the seconds field advances by one. The channel value may be the audio channel number, with 0 being the first channel. The CRC8 field may be an 8-bit cyclical redundancy check code that provides for the integrity of the preceding 7 bytes. These descriptors may be multiplexed into the audio channel byte stream in any number of patterns and combinations. Other descriptors are contemplated by this disclosure.

Figure 7:
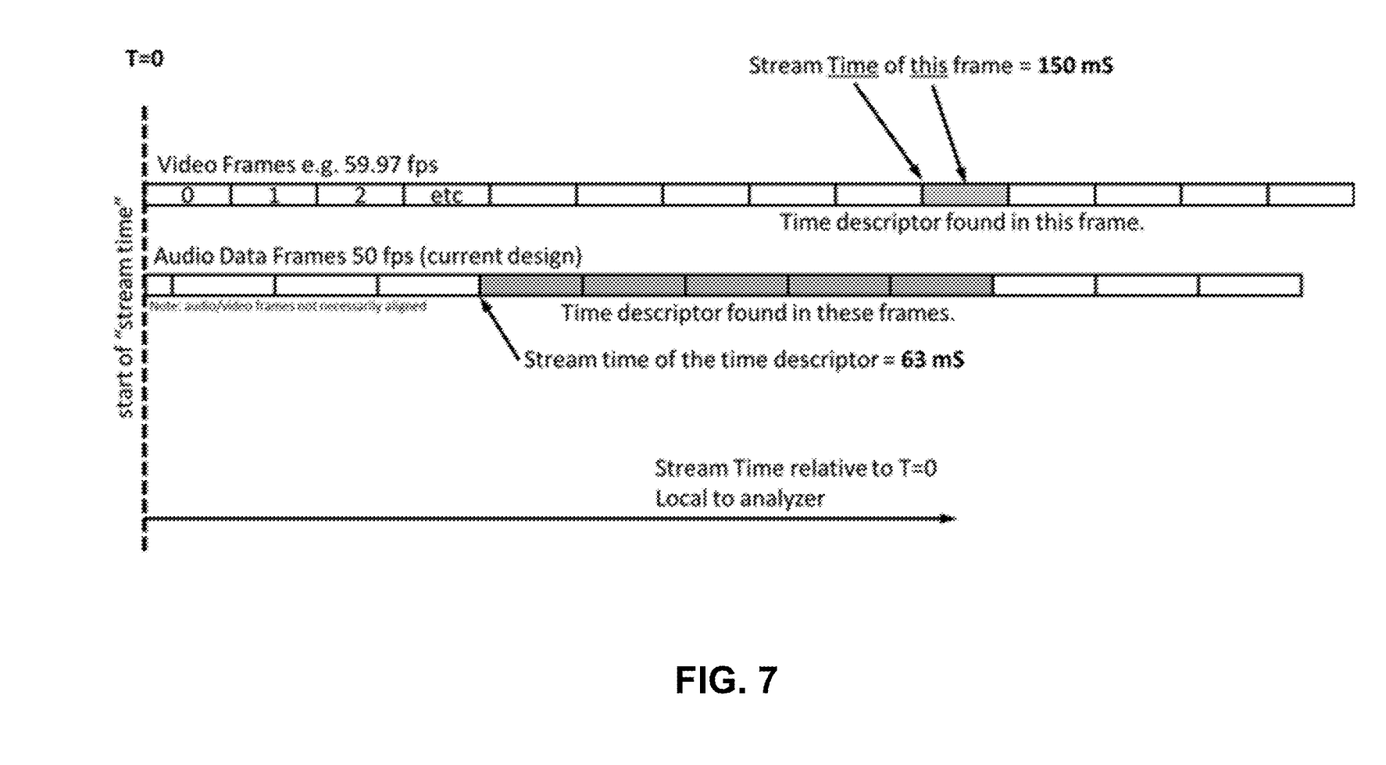
FIG. 7 is a conceptual diagram illustrating a video stream and a corresponding audio stream.

Quality assessment system 16 may decode video and audio streams to determine an audio/video time offset between them. The descriptors chosen to compare audio and video need not appear coincidentally in the program (e.g., HDMI or SDI signal) but the offset in their arrival times may be compensated for. FIG. 7 is a conceptual diagram illustrating a video stream and a corresponding audio stream. Quality assessment system 16 may track stream time. As used herein, stream time may refer to a timebase (e.g., a time period used as a base measurement or frequency) with the same frequency as the incoming streams' timebase, but with an arbitrary starting point (e.g., an offset or epoch). The arbitrary starting point may be canceled out or removed in the calculations that follow. The arbitrary starting point may be zero at the time analysis of the streams starts or resets.

In the example of FIG. 7, frame 9 of the video stream is highlighted. Its stream time is 150 ms. The video stream contains a time_and_channel descriptor that indicates seconds=1,600,000,000 and tics480=0. In the audio stream, a series of five 2-byte frames containing a time_and_channel descriptor is found at stream time=63 ms. In this example, the stream time is considered as the start of the descriptor, though other definitions are possible. The descriptor has seconds=1,599,999,999 and tics480=432,480 which is 0.901 seconds for a total of 1,599,999,999.901 seconds.

The offset between the times the descriptors were found is (150−63) ms. Based on the video descriptor's timestamp and the offset, the value of the audio timestamp is expected to be: 1,600,000,000+(0.063−0.150)=1,599,999,999.91 so the audio offset is the difference between the expected value and the actual value: 1,599,999,999.91−1,599,999, 999.901=0.009 seconds. Audio is 9 ms late.

Figure 8:
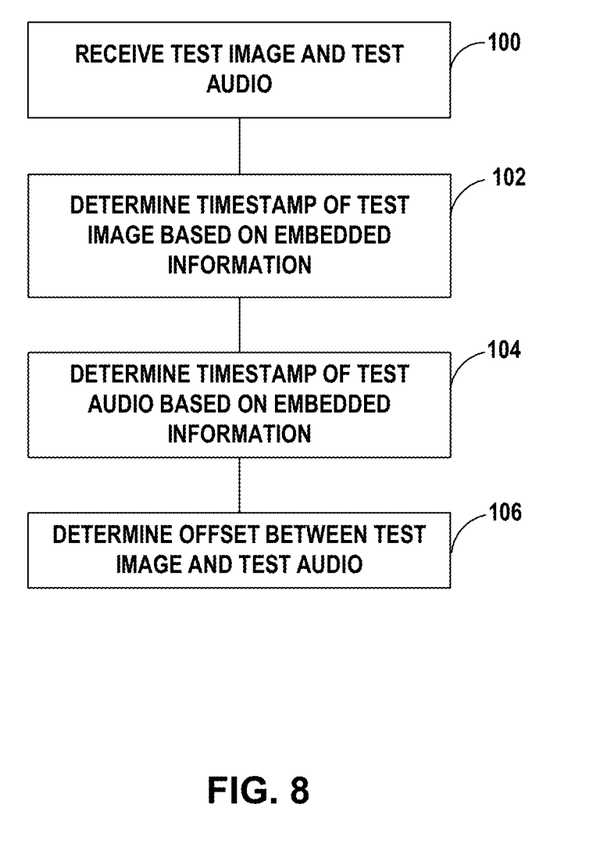
FIG. 8 is a flowchart illustrating an example operation of system in accordance with techniques of this disclosure.

FIG. 8 is a flowchart illustrating an example operation of system 10 in accordance with techniques of this disclosure.

Quality assessment system 16 may receive test image 22 of a video test stream and test audio 58 of an audio test stream from production system 12 via network 14 (100). Quality assessment system 16 may determine a timestamp for test image 22 based on embedded information 20 in test image 22 (102). For example, pixel value module 40 may determine the pixel value of each chip of an array of chips. Chip value module 42 may determine the chip value for each chip based on the pixel value for each chip. For example, chip value module 42 may apply a table or function stored in data repository 48 to the pixel value for each chip to determine an associated chip value. Chip analysis module 38 may convert the chip value for each chip into one or more digital bits of information. Chip analysis module 38 may parse the one or more digital bits of information to determine a timestamp for test image 22. In examples where production system 12 includes fixed pattern 52 in embedded information 20 of test image 22, pattern analysis module 44 may determine a sub-second component of the timestamp for test image 22.

Audio analysis module 46 may determine a timestamp for test image 22 based on embedded information 60 in test audio 58 (104). For example, audio analysis module 46 may detect a bit sequence data structure including a starting bit, one or more payload bits, a parity bit, and two or more stop bits. The bit sequence data structure may be an example of a Differential Manchester line code. Audio analysis module 46 may determine the timestamp for test audio 58 based on the one or more payload bits.

Offset module 47 may determine an offset between the timestamp for test image 22 and the timestamp for test audio 58 (106). For example, assuming that the stream times for the video test stream and the audio test stream are the same (such that the descriptors for the respective streams are found at the same time), then offset module 47 may determine that the offset between the video test stream and the audio test stream is equal to the difference between the timestamp for test image 22 and the timestamp for test audio 58.

In another example, the stream times for the video test stream and the audio test stream may be different. For example, the video test stream at a stream time of 150 ms may contain a time_and_channel descriptor that indicates seconds=1,600,000,000 and tics480=0. An audio stream at a stream time of 63 ms may contain a time_and_channel descriptor that indicates seconds=1,599,999,999 and tics480=432,480, which is 0.901 seconds for a total of 1,599,999,999.901 seconds. Offset module 47 may determine that the offset between the times the descriptors were found is (150−63) ms. Based on the video descriptor's timestamp and the offset, the value of the audio timestamp is expected to be: 1,600,000,000+(0.063−0.150)=1,599,999,999.91 so the audio offset is the difference between the expected value and the actual value: 1,599,999,999.91−1,599,999,999.901=0.009 seconds. Offset module 47 may output that the audio is late by 9 ms and optionally correct that offset (e.g., by adding a delay of 9 ms to the video removing 9 ms from the audio, etc.).

Television generally consists of video and audio signals, and there are various standard video frame rates and sampling frequencies in use. Common video frame rates are 24, 25, 30, 50, 60; 24000/1001, 30000/1001, and 60000/1001. Professional audio is sampled at 48,000 samples per second.

In one instance, various aspects of the techniques enable conveying a timestamp in each channel of the audio content itself, as opposed to carrying the timestamp in metadata, which tends to become lost or erroneous. It may be useful to provide time markers in the audio and video often, so that as delay is added or removed from a given channel, the measured effect is reflected quickly so that adjustments can be made without waiting for a new measurement.

In some examples, quality assessment system 16 may positively identify the audio and video signals as a test signal, and the test signals may include type and version numbers, so that analyzer 16 can determine if their software is sufficient to support the signal. For multichannel systems, the original audio source channel numbers may be marked as data in the audio signal, so that downstream audio channel reassignment can be detected, and analyzer 16 may measure audio-video offsets for each channel independently. Analyzer 16 may also be able to recover data from an inverted audio signal and be configured to detect and report that such an inversion has taken place.

While professional, uncompressed digital audio systems have a capacity of 768 kBits per second per channel (48,000 samples per second×16 bits per sample), part of the signal chain may include audio compression. Arbitrary data in the 768 kb/s channel may be destroyed by such compression systems. As such, the data is defined in such a manner to be robust to audio compression. The audio test signal be of a known amplitude, so that existing audio meters may be used to check the audio's level.

In one or more examples, the functions described above may be implemented in hardware, software, firmware, or any combination thereof. For example, various devices and/or components of the above-described drawings may be implemented in hardware, software, firmware, or any combination thereof. If implemented in software, the functions may be stored on or transmitted over, as one or more instructions or code, a computer-readable medium and executed by a hardware-based processing unit, i.e., processing circuitry. Computer-readable media may include computer-readable storage media, which corresponds to a tangible medium such as data storage media, or communication media including any medium that facilitates transfer of a computer program or data from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product such as an application may also include a computer-readable medium as well as sent through a network, stored in memory and executed by processing circuitry.

By way of example, and not limitation, such computer-readable storage media, may include memory. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Combinations of the above should also be included within the scope of computer-readable media.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A computing system comprising:
   an interface configured to receive, from a production system, a first test stream and a second test stream;
   a memory in communication with the interface, wherein the memory is configured to store at least a portion of the first test stream and at least a portion of the second test stream; and
   processing circuitry in communication with the memory, wherein the processing circuitry is configured to:
      detect first embedded information in the first test stream representative of a first timestamp and second embedded information in the second test stream representative of a second timestamp;
      determine, based on the first timestamp and the second timestamp, an offset between the first test stream and the second test stream; and
      output the offset,
   wherein the first test stream comprises an image,
   wherein the first embedded information in the image comprises a plurality of chips,
   wherein each chip in the plurality of chips has a chip value associated with a pixel value, and
   wherein there are more than two possible pixel values.

2. The computing system of claim 1, wherein the second test stream comprises test audio that corresponds to the first test stream.

3. The computing system of claim 2, wherein the second embedded information in the test audio comprises a bit sequence data structure comprising a starting bit, one or more payload bits, a parity bit, and two or more stop bits.

4. The computing system of claim 1,
   wherein the embedded information in the image further comprises a fixed pattern having a phase that corresponds at least in part to a frame associated with the image of the first test stream, and
   wherein the processing circuitry is further configured to:
      determine the phase of the fixed pattern; and
      determine, based on the phase, a frame rate for the image.

5. The computing system of claim 4,
   wherein the embedded information further comprises a reference pattern, and
   wherein, to determine the phase of the fixed pattern, the processing circuitry is configured to determine the phase of the fixed pattern by, at least in part, comparing the fixed pattern to the reference pattern.

6. The computing system of claim 5,
   wherein, to compare the fixed pattern to the reference pattern, the processing circuitry is configured to compare the fixed pattern to the reference pattern at a set of phase positions for the fixed pattern, and
   wherein the set of phase positions derives from the frame rate of the first test stream.

7. The computing system of claim 5, wherein the processing circuitry is configured to:
   determine whether a frame rate of the first test stream is being converted from a first integer frame rate to a second integer frame rate or to a first fractional frame rate to a second fractional frame rate; and
   responsive to determining that the frame rate of the first test stream is being converted from the first integer frame rate to the second integer frame rate or to the first fractional frame rate to the second fractional frame rate, compare the fixed pattern to the reference pattern at the set of phase positions for the fixed pattern,
   wherein the set of phase positions derives from the frame rate of the first test stream.

8. The computing system of claim 5, wherein the processing circuitry is configured to compare the fixed pattern to the reference pattern using motion estimation.

9. The computing system of claim 1,
   wherein the first timestamp represents a duration between a transmission time of the first test stream and a reference time, and
   wherein the duration is an integer number of seconds.

10. A method comprising:
    receiving, by an interface, a first test stream and a second test stream from a production system;
    storing, to a memory in communication with the interface, at least a portion of the first test stream and at least a portion of the second test stream;
    detecting, by processing circuitry of the interface, first embedded information in the first test stream representative of a first timestamp;
    detecting, by the processing circuitry of the interface, second embedded information in the second test stream representative of a second timestamp;

determining, by the processing circuitry and based on the first timestamp and the second timestamp, an offset between the first test stream and the second test stream; and outputting, by the processing circuitry, the offset, wherein the first test stream comprises a image, wherein the first embedded information in the image comprises a plurality of chips, wherein each chip in the plurality of chips has a chip value associated with a pixel value, and wherein there are more than two possible pixel values.

11. The method of claim 10, wherein the second test stream comprises test audio that corresponds to the first test stream.

12. The method of claim 11, wherein the second embedded information in the test audio comprises a bit sequence data structure comprising a starting bit, one or more payload bits, a parity bit, and two or more stop bits.

13. The method of claim 10,
wherein the embedded information in the image further comprises a fixed pattern having a phase that corresponds at least in part to a frame associated with the image of the first test stream, and
wherein the method further comprises:
determining, by the processing circuitry, the phase of the fixed pattern; and
determining, by the processing circuitry and based on the phase, a frame rate for the image.

14. The method of claim 13, wherein the embedded information further comprises a reference pattern, and wherein determining the phase of the fixed pattern comprises comparing, by the processing circuitry and at least in part, the fixed pattern to the reference pattern.

15. The method of claim 14, wherein comparing the fixed pattern to the reference pattern comprises comparing, by the processing circuitry, the fixed pattern to the reference pattern at a set of phase positions for the fixed pattern, and wherein the set of phase positions derives from a frame rate of the first test stream.

16. The method of claim 14, wherein the method further comprises:
determining, by the processing circuitry, whether a frame rate of the first test stream is being converted from a first integer frame rate to a second integer frame rate or to a first fractional frame rate to a second fractional frame rate; and
responsive to determining that the frame rate of the first test stream is being converted from the first integer frame rate to the second integer frame rate or to the first fractional frame rate to the second fractional frame rate, comparing, by the processing circuitry, the fixed pattern to the reference pattern at the set of phase positions for the fixed pattern, wherein the set of phase positions derives from the frame rate of the first test stream.

17. The method of claim 14, wherein comparing the fixed pattern to the reference pattern comprises using, by the processing circuitry, motion estimation.

18. A non-transitory computer-readable storage medium encoded with instructions that, when executed, cause processing circuitry of an interface to:
receive a first test stream and a second test stream;
store, to the non-transitory computer-readable storage medium, at least a portion of the first test stream and at least a portion of the second test stream;
detect first embedded information in the first test stream representative of a first timestamp and second embedded information in the second test stream representative of a second timestamp;
determine, based on the first timestamp and the second timestamp, an offset between the first test stream and the second test stream; and
output the offset,
wherein the first test stream comprises a image,
wherein the first embedded information in the image comprises a plurality of chips,
wherein each chip in the plurality of chips has a chip value associated with a pixel value, and
wherein there are more than two possible pixel values.

* * * * *